United States Patent Office 2,907,798
Patented Oct. 6, 1959

2,907,798

PREPARATION OF TETRAHALOMETHANES

Robert N. Haszeldine, Cambridge, England, and Hyman Iserson, Springfield Township, Montgomery County, Pa., assignors to Pennsalt Chemicals Corporation, Philadelphia, Pa., a corporation of Pennsylvania No Drawing. Application May 7, 1957
Serial No. 657,493

Claims priority, application Great Britain
October 12, 1955

12 Claims. (Cl. 260—653)

This invention relates to a new method for producing tetrahalomethanes, and is a continuation-in-part of our copending application Serial No. 586,901, filed May 24, 1956, and now abandoned.

Tetrahalomethanes are useful in a great number of industrial applications, for example as solvents, refrigerants and fire extinguishers, to mention a few. Many of these compounds are still relatively expensive, however, and a general, economical process for their manufacture has long been sought.

The present invention is based on the discovery that carbonyl halides can be reacted with certain pentahalides of group V elements having +3 and +5 valences to give tetrahalomethanes in high yield. It is of interest that by the present invention for the first time carbonyl oxygen, attached to carbon which also carries two strongly electro-negative groups such as halogen, can be replaced by halogen.

The general reaction may be written (1)

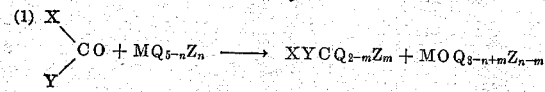

where X and Y, Q and Z are bromine, fluorine or chlorine, where M is an element of group V of the periodic table having +3 and +5 valences such, for example, as phosphorous, arsenic, antimony or bismuth, where $n$ is an integer from 0 to 5 and where $m$ is an integer not greater than $n$, from 0 to 2. Q is normally of less atomic weight than Z, and in such case $m$ is normally equal to $n$ when $n$ is less than 3, and is equal to 2 when $n$ is greater than 2. In general the corresponding trihalide and halogen may be used in place of the pentahalide if desired. Thus, combinations of $MQ_{3-p}Z_p$, where $p$ is from 0 to 3, may be used with $Z_2$ or $Q_2$ in place of $MQ_{5-n}Z_n$. $SO_2Cl_2$ may also be used as a halogenating agent in certain cases.

Typical reactions of this general class are:

(2)  $PCl_5+COCl_2 \rightarrow CCl_4+POCl_3$
(3)  $PCl_5+COF_2 \rightarrow CCl_2F_2+POCl_3$
(4)  $PCl_2F_3+COF_2 \rightarrow CCl_2F_2+POF_3$
(5)  $PF_5+COCl_2 \rightarrow CF_2Cl_2+POF_3$
(6)  $PCl_5+COClF \rightarrow CCl_3F+POCl_3$
(7)  $PF_3Cl_2+COCl_2 \rightarrow CCl_4+POF_3$
(8)  $PF_3Cl_2+COFCl \rightarrow CFCl_3+POF_3$
(9)  $PF_3Cl_2+COFBr \rightarrow CFCl_2Br+POF_3$
(10) $PCl_5+COBr_2 \rightarrow CCl_2Br_2+POCl_3$
(11) $PBr_5+COCl_2 \rightarrow CCl_2Br_2+POBr_3$
(12) $PF_3Br_2+COCl_2 \rightarrow CBr_2Cl_2+POF_3$
(13) $PF_3Br_2+COF_2 \rightarrow CBr_2F_2+POF_3$ It will be understood that the above reactions merely indicate the more desirable changes which occur. Various other reactions may also take place, forming other products. The nature and proportion of these products depends on the initial reactants and on the reaction conditions.

For example, referring to Reaction 3 above, phosphorous pentachloride reacts with carbonyl fluoride in an autoclave at temperatures from about 50° C. to about 600° C. to form dichlorodifluoromethane, monochlorotrifluoromethane, phosgene and chlorofluorophosgene. An appreciable quantity of $CCl_4$ is also formed, particularly at temperatures above 350° C. While the exact mechanism of the reaction has not been established, it is considered likely that the following transformations may occur:

(3)  $PCl_5+COF_2 \rightarrow CF_2Cl_2+POCl_3$
(3a) $2PCl_5+3COF_2 \rightarrow 3COCl_2+2PF_3Cl_2$
(3b) $COCl_2+COF_2 \rightleftharpoons 2COFCl$
(3c) $2COFCl \rightarrow CF_2Cl_2+CO_2$
(3d) $COF_2+CF_2Cl_2 \rightarrow CF_3Cl+COFCl$
(3e) $COCl_2+PCl_5 \rightarrow CCl_4+POCl_3$ Thus Equation 3a indicates the formation of phosgene which may then react with additional $COF_2$ to give $COFCl$ and finally $CF_2Cl_2$ (Equations 3b and 3c). At higher temperatures, and particularly above 350° C., the $COCl_2$ thus formed is converted to $CCl_4$ by $PCl_5$ (Equation 3e). The formation of $CF_3Cl$ is attributed to the fluorination of $CF_2Cl_2$ by $COF_2$ (Equation 3d).

Similarly, with respect to Reaction 4, in addition to $CCl_2F_2$ and $POF_3$, $COFCl$, $CO_2$, $CF_3Cl$ and $CCl_4$ are obtained.

These products may be attributed to the following reactions accompanying Reaction 4:

(4a) $5PF_3Cl_2 \rightarrow 3PF_5+2PCl_5$
(4b) $3COF_2+2PCl_5 \rightarrow 3COCl_2+2PF_3Cl_2$ and other reactions as in (3a) to (3e).

The reactions are, in general, conducted by placing the reactants in an autoclave and heating to a temperature between about 50° C. and about 600° C. The pressure is that generated in the closed system, and is not considered critical. Usually it will be between about 1 and about 500 atmospheres, preferably between about 1 and about 200 atmospheres.

The ratio of metalloid halide to carbonyl halide may vary considerably and may range from say 0.01 to about 30 moles of metalloid halide, per mole of carbonyl halide. When reaction conditions are such that the metalloid halide can be regenerated, in the manner explained below, it becomes practicable to operate with less than 1 mole (say 0.01 to about 0.8 mole) of metalloid halide, per mole of carbonyl halide. If the reaction conditions do not permit regeneration of the metalloid halide, reducing the proportion of metalloid halide to less than the stoichiometric amount will simply result in a smaller yield.

The precise temperature employed will depend on the particular reactants involved. Thus, for Reactions 2 and 7 the temperature is broadly between 50° C. and about 600° C., usually between about 300° C. and about 425° C. Reactions 3, 4, 5, 6, and 8 should be conducted between about 250° C. and about 350° C. Reactions 9 to 13 are usually carried out between about 50° C. and about 600° C., preferably between about 100° C. and about 300° C.

One of the outstanding advantages of the present process is that the phosphorous compound used as an initial reactant can in many cases be regenerated with relative ease. Taking, for example, the reaction (2)  $PCl_5+COCl_2 \rightarrow CCl_4+POCl_3$ the by-product $POCl_3$ may be removed and reacted with carbon monoxide in the presence of carbon to yield $PCl_3$, or with more $COCl_2$ to give $PCl_5$, as described in German Patent 492,061. These reactions are (14)

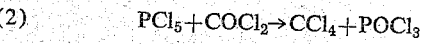

(14a)

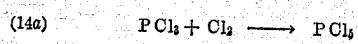

or

(15) $$POCl_3 + COCl_2 \xrightarrow{C} PCl_5 + CO_2$$

In Equation 15 $CO+Cl_2$ may be used in place of $COCl_2$.

If desired, $Cl_2$, $PCl_3$ and CO may be used as the starting materials to give a cyclic process particularly suitable for industrial application, viz.

(16)
(a) $$CO + Cl_2 \longrightarrow COCl_2$$
(b) $$PCl_3 + Cl_2 \longrightarrow PCl_5$$
(c) $$COCl_2 + PCl_5 \longrightarrow CCl_4 + POCl_3$$
(d) $$POCl_3 + CO \xrightarrow[400°\,C.]{C} PCl_3 + CO_2$$

The overall equation may be written

(17) $$2CO + 2Cl_2 \xrightarrow[\text{or } PCl_5]{PCl_3 + Cl_2} CCl_4 + CO_2$$

with the phosphorous trichloride or pentachloride acting, in a sense, as a catalyst. However, a series of equilibria is clearly involved, the phosphorous tri- or penta-chloride being regenerated in situ. Thus $CCl_4$ is obtained from carbon monoxide and chlorine, both of which are inexpensive and readily available.

Preferably, Reactions 16 and 17 are carried out with activated carbon which may be promoted with various substances such as iron and nickel compounds, particularly ferric and nickel halides, such as ferric or nickel chloride.

In Equations 16 and 17 the carbon monoxide to chlorine mole ratio can be varied from say 1:10 to 10:1 but is preferably about 1:1. Activated carbon must be present in more than 100% excess, i.e. more than 1 mole of carbon for each mole of carbon monoxide or chlorine, whichever is present initially in larger amount.

The amount of phosphorous trichloride or phosphorous pentachloride used in Equations 16 and 17 can be varied between say 0.01 and 0.8 mole per mole of carbon monoxide or chlorine, whichever of the last two compounds is present initially in larger amount. When phosphorous trichloride is used sufficient chlorine is added, in addition to the amount defined above, to convert theoretically the $PCl_3$ into $PCl_5$.

It is noteworthy, as is hereinafter shown, that with the smaller amounts of phosphorous tri- or pentachloride used in the process of Equations 16 and 17, carbon dioxide is produced in an amount very nearly equivalent, on a molar basis, to the amount of carbon tetrachloride produced, whereas where larger amounts of phosphorous halides are employed little carbon dioxide is formed. The fact that in Reactions 16 and 17 carbon dioxide is formed in substantial amounts affords confirmation of the phosphorous halide regeneration reactions postulated above.

The invention will be further described in the following specific examples.

*Example I*

A 300 ml. stainless steel autoclave was charged with 208.5 grams $PCl_5$. The autoclave was evacuated and 45.7 grams $COCl_2$ was introduced in vacuo. The autoclave was then placed in a shaking apparatus, heated to 362° C. and kept at 362° C. to 374° C. for 19.5 hours. It was then cooled and vented to two traps in series which were cooled in liquid oxygen. When the system reached atmospheric pressure, it was evacuated while the autoclave was heated strongly with an open flame. The traps were then restored to atmospheric pressure and the products were passed through a wash bottle containing 15% aqueous KOH and in series with a Dry Ice-acetone cooled trap. About 1.5 grams material collected in the Dry Ice-acetone trap and this was discarded. The less volatile liquid which remained in the venting traps was washed with water, dried and distilled to give 42 grams, boiling point at 73–75° C. This material was steam distilled from sodium carbonate solution. The lower layer in the distillate was dried and redistilled through a 6″ helix-packed column to give 35.5 grams of carbon tetrachloride, boiling point 76° C., identified by means of infrared spectrum. It was free from $PCl_3$.

*Example II*

A 300 ml. stainless steel autoclave was charged with 50 grams (0.5 mole) $COCl_2$ and 125 grams (0.6 mole) $PCl_5$ in vacuo. The bomb was heated in a shaking apparatus at 362–372° C. for 18.5 hours. It was then vented as described in Example I. The traps were warmed up to room temperature, and volatile gases were transferred to a vacuum apparatus and found to be equivalent to only 0.0038 mole of gas. An infra-red spectrum showed that more than 80% of this gas consisted of $COCl_2$, (ca. 1% of starting material) and about 15% $CO_2$. This is equivalent to only 0.0006 mole of carbon dioxide, which shows that this compound is not a major product. The liquid products of boiling point greater than 20° C. were distilled through a two foot helix-packed column which was fitted with an ice water-cooled receiver. There were obtained:

(1) 80 grams, boiling point 74.2–77° C.
(2) 4 grams, boiling point 80–104.5° C.
(3) More than 26 grams, boiling point 105° C.
(4) The autoclave still contained $POCl_3$ (18 grams) which was distilled at 100–106° C. Weight=12.5 grams.

Analysis of fraction 1 showed it to contain more than 70% $CCl_4$. This corresponds to a yield of at least 73%. Fraction 2 contained $CCl_4$, $POSl_3$, and $PCl_3$, and fractions 3 and 4 were $POCl_3$.

*Example III*

A 300 ml. autoclave was charged with 100 grams (0.48 mole) $PCl_5$, closed, evacuated and cooled in liquid oxygen. Twenty-five grams $COF_2$ were distilled into the evacuated autoclave which was then heated in a shaking apparatus for 16 hours at about 265° C. It was cooled to room temperature, vented to liquid nitrogen-cooled traps and was finally heated while the system was evacuated. The product in the traps was washed three times with 15% aqueous KOH. The alkali-treated material was found to be almost pure dichlorodifluoromethane by examination of its infra-red spectrum. The yield, based on the amount of $COF_2$ taken for the reaction, was somewhat more than 10%. Only a trace of $CF_3Cl$ was formed.

*Example IV*

208 grams (1 mole) of $PCl_5$ was placed in a Monel autoclave which was then evacuated and cooled in liquid nitrogen. 25 grams $COF_2$ were distilled into the autoclave in vacuo. The charged autoclave was heated at 330 to 350° C. for 12 hours, in a shaking apparatus, cooled and vented to traps cooled in liquid nitrogen, finally with evacuation. These traps were then vented to a Dry-Ice-ethanol-cooled trap and a liquid nitrogen-cooled trap connected in series. The material which collected in the Dry-Ice-ethanol-cooled trap was mostly phosgene with some dichlorodifluoromethane and some carbonyl chlorofluoride as shown by infra-red spectroscopic examination. The product in the liquid nitrogen-cooled trap contained some $POF_3$ and dichlorodifluoromethane as shown by spectroscopic examination. No carbonyl fluoride was present. The contents of these traps were washed with dilute aqueous potassium hydroxide; the gases which did not react with the caustic were caught in a liquid nitrogen-cooled trap and found to be almost pure dichlorodifluoromethane. Yield, 3.5%. The bomb was opened and the contents, liquid and solid, were removed. The liquid, 35 grams, was washed with water to remove $PCl_3$ and traces of phosgene, dried and distilled. Carbon tetrachloride was obtained at 76.5 to 79° C. The yield was 25%. The solid reacted completely with water and was excess $PCl_5$.

*Example V*

Carbonyl fluoride, 0.14 mole, was distilled into a 100 ml. stainless steel autoclave in vacuo. Phosphorous dichlorotrifluoride (0.22 mole) was added similarly. The autoclave was heated in a salt bath for 12 hours at 300° C., cooled and then vented, finally with evacuation to a liquid oxygen-cooled trap. Spectroscopic examination of the gaseous products revealed the presence of $COCl_2$, $CF_2Cl_2$ and other compounds. The contents of the trap were then passed through 15% KOH, and the unreacted gas, examined by infra-red, consisted only of $CF_2Cl_2$. The yield of $CF_2Cl_2$, based on the amount of $COF_2$ taken for the reaction was 1.4%.

*Example VI*

A 300 ml. stainless steel autoclave was charged with phosphorous pentachloride (0.48 mole) and a carbonyl fluoride (0.38 mole), heated at 100° for 24 hours, then cooled and vented into a series of cooled traps. The products were examined by infra-red spectroscopy and found to contain carbonyl chlorofluoride carbon dioxide, dichlorodifluoromethane, chlorotrifluoromethane, phosgene and unreacted carbonyl fluoride and phosphorous pentachloride. The gaseous products were washed with 20% aqueous sodium hydroxide and the washed material found to consist of dichlorodifluoromethane and chlorotrifluoromethane.

*Example VII*

To a 100 ml. stainless steel autoclave two-thirds full of active carbon pellets (Sutcliffe-Speakman 207C) mixed with animal charcoal powder (10 grams) was added anhydrous ferric chloride (3.1 grams), chlorine (2 grams), nickel carbonyl (1.5 grams) and iron carbonyl (2.0 grams). The autoclave was heated to 400° C. for 12 hours, then cooled to room temperature and pumped out for 5 hours. Carbon monoxide (0.20 mole), chlorine (0.25 mole), and phosphorous trichloride (0.05 mole) were added to the autoclave which was then heated to 400° C. for 9 hours. Only carbon dioxide (0.031 mole, 31%), carbon monoxide and phosgene were detected as volatile products when the autoclave was opened at room temperature. The less volatile products were removed in vacuo whilst the autoclave was heated to 350° C. during 2 hours. After being washed with dilute aqueous sodium hydroxide, the liquid products were distilled from phosphoric anhydride to give only carbon tetrachloride (0.044 mole, 44%), boiling point 75–76° C.

*Example VIII*

The process of Example I was repeated except that the reactants were heated at 430° C. for 16 hours. Carbon tetrachloride was formed in 48% yield (0.048 mole) and carbon dioxide in 37% yield (0.37 mole).

The percentage yields quoted in the above two examples are calculated with respect to carbon monoxide on the basis of the reaction $$2CO + 2Cl_2 \rightarrow CCl_4 + CO_2$$

What we claim is:

1. A method for making tetrahalomethanes which comprises reacting a carbonyl halide having the general formula

where X and Y are selected from the group consisting of fluorine, chlorine and bromine with a reactant selected from the group consisting of pentahalides having the general formula $$MQ_{5-n}Z_n$$

where M is a group V element having +3 and +5 valences, Q and Z are selected from the group consisting of fluorine, chlorine and bromine, and $n$ is a number from 0 to 5; and mixtures of a metalloid trihalide having the general formula $$MQ_{3-p}Z_p$$

where $p$ is a number from 0 to 3 and Q, Z and M are as defined above, and a halogen selected from the group consisting of $Z_2$ and $Q_2$ at a temperature between about 50° C. and about 600° C., the molar ratio of said reactant to said carbonyl halide being between about 0.01:1 and about 20:1, and recovering a tetrahalomethane having the general formula $$CXYQ_{2-m}Z_m$$

where X, Y, Q and Z are as defined above and $m$ is a number from 0 to 2.

2. The method claimed in claim 1 wherein the group V element is phosphorous.

3. A method for making carbon tetrachloride which comprises reacting a reactant consisting essentially of a phosphorous pentahalide containing chlorine and free from iodine, with phosgene, at a temperature between about 50° C. and about 600° C., the molar ratio of said pentahalide to phosgene being between about 0.01:1 and about 30:1.

4. The method claimed in claim 3 wherein the reaction is conducted between about 300° C. and about 450° C.

5. A method for making chlorofluoromethanes, which comprises reacting carbonyl fluoride with a reactant consisting essentially of phosphorous pentachloride, at a temperature between about 50° C. and about 600° C., the proportion of phosphorous pentachloride to carbonyl fluoride being from about 0.01:1 to about 30:1.

6. A method for making chlorofluoromethanes, which comprises reacting carbonyl fluoride with a reactant consisting essentially of phosphorous dichlorotrifluoride, at a temperature between about 50° C. and about 600° C., the proportion of phosphorous dichlorotrifluoride to carbonyl fluoride being between about 0.01:1 and about 30:1.

7. A cyclic process for the production of carbon tetrachloride, which comprises reacting a reactant consisting essentially of phosphorous pentachloride with phosgene at a temperature between about 100° C. and about 450° C., the molar ratio of phosphorous pentachloride to phosgene being between about 0.01:1 and about 30:1, to give carbon tetrachloride and phosphoryl chloride, reacting said phosphoryl chloride with carbon monoxide to give phosphorous trichloride and reacting the phosphorous trichloride with chlorine to regenerate phosphorous pentachloride.

8. A cyclic process for the production of carbon tetrachloride, which comprises reacting phosgene with a reactant consisting essentially of phosphorous pentachloride at a temperature between about 100° C. and about 450° C., the molar ratio of phosphorous pentachloride to phosgene being between about 0.01:1 and about 30:1, to give carbon tetrachloride and phosphoryl chloride, and reacting the phosphoryl chloride with additional phosgene to regenerate the phosphorous pentachloride.

9. A cyclic method for the production of carbon tetrachloride, which comprises reacting carbon monoxide and chlorine to form phosgene, reacting phosphorous trichloride and chlorine to form phosphorous pentachloride, reacting said pentachloride with said phosgene at a temperature between about 100° C. and about 450° C., the molar ratio of phosphorous pentachloride to phosgene being between about 0.01:1 and about 30:1, to form carbon tetrachloride and phosphoryl chloride and reacting said phosphoryl chloride with carbon monoxide to regenerate phosphorous trichloride.

10. A method for making carbon tetrachloride which comprises reacting a reactant consisting essentially of $PCl_5$ with phosgene at a temperature between about 50°

C. and about 600° C., the molar ratio of $PCl_5$ to phosgene being between about 0.01:1 and about 30:1.

11. The method claimed in claim 10 wherein the $PCl_5$ is formed in situ by the reaction of $PCl_3$ and $Cl_2$.

12. A method for making carbon tetrachloride which comprises reacting a reactant consisting essentially of $PCl_2F_3$ with phosgene at a temperature between about 50° C. and about 600° C., the molar ratio of $PCl_2F_3$ to phosgene being between about 0.01:1 and about 30:1.

References Cited in the file of this patent

UNITED STATES PATENTS 2,757,214     Muetterties  ---------- July 31, 1956